May 26, 1936.    J. LA VIA    2,042,344
LIGHT REGULATING MEANS
Filed March 6, 1931
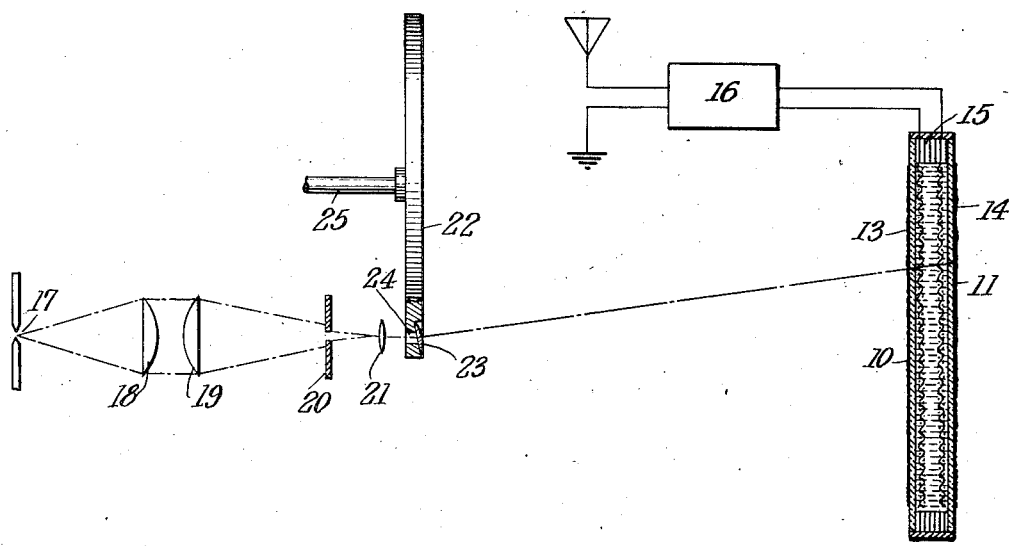
INVENTOR
Joseph La Via
BY
ATTORNEY Patented May 26, 1936

2,042,344

UNITED STATES PATENT OFFICE 2,042,344

LIGHT REGULATING MEANS

Joseph La Via, St. Albans, N. Y.

Application March 6, 1931, Serial No. 520,548

4 Claims. (Cl. 178—6)

This invention relates to light regulating means particularly to that type which may be used to receive projected images from a television receiver.

The present invention is an improvement over the type of apparatus disclosed in patent to A. Karolus, No. 1,762,231, dated June 10, 1930, for Receiver arrangement for electric television apparatus, wherein a Kerr type cell is interposed between the eye of the observer and the screen which received a beam of light from a constant source and wherein the Kerr type cell—in which the light is directed onto the screen or the image plane as radiated from a light source, that is without previous regulation as to brightness and the image is then viewed through the medium of a lighting relay which is arranged intermediate the eye and the image.

It is also an improvement over the type of apparatus disclosed in British patent to August Karolus, No. 235,857—wherein a Kerr cell was mounted between a pair of Nicol prisms and arranged to be subjected to an electrostatic or magnetic field which is varied in accordance with the shade of the transmitted picture.

In Alexanderson—Pat. No. 1,783,031, he described his improvement over the above British patent by substituting for the Nicol prisms, a stack of glass plates for polarizing the light in a single plane and an analyzer likewise comprised of a stack of glass plates.

In the construction shown in the British patent, and in the Alexanderson patent, the received image or picture must be enlarged onto a screen and thus losses in definition occur.

In contradistinction to this it is an object of the present invention to combine the Kerr cell and polarizer and analyzer in such manner that the unit becomes the screen. That is to say, the polarizer and analyzer are very much enlarged and have disposed between them an enlarged Kerr cell, thus eliminating the necessity for projection of the received image. The image is reconstructed directly on the large unit.

Another object is to effectively combine a light valve and screen for the reception and display of television images.

An object of the invention is to provide means for economically and efficiently receiving television signals and reconstruct on a relatively large screen, the image originally transmitted.

A further object is the provision of a highly efficient and sensitive light valve.

A further object is the provision of means to control and regulate the density of light received through a window or other opening.

The figure is a diagrammatic showing of a picture receiving apparatus wherein my invention has been embodied.

It is known that if quinine sulphate be dissolved in strong acetic acid, warmed and an alcoholic solution of iodine added gradually, thin rectangular plates are deposited, on cooling. These crystals transmit light which is perfectly polarized so that if another plate be laid upon the first, no light is transmitted when their principal axes are at right angles.

Advantage is taken of this principal in the construction of one embodiment of my invention.

Two sheets of transparent material such as glass 10—11 are coated with polarizing crystals 13—14 and arranged relative to each other so that their principal axes are at right angles. The plates are spaced apart and confine between them a Kerr cell 15 having an effective light affecting area substantially co-extensive with the plates and this cell is connected to receive electrical impulses dependent on the shade of the transmitted picture through a radio receiving apparatus 16.

One plate polarizes the light in a single plane and the other plate analyzes the light transmitted through the Kerr cell.

These plates and the enclosed Kerr cell are of such dimensions as to produce an image large enough to be viewed at a distance.

One surface of the analyzer is preferably of ground glass so that it may act effectively as a receiving and viewing screen.

Light from a constant source 17 is collected by lens 18 and directed into a converging lens 19 and thence onto an aperture plate 20 and thence through an objective lens 21.

A scanning mechanism 22 causes light penetrating from the source 17 to fall upon the translucent plate 11.

In operation, television signals from a broadcasting television station are received and translated by the radio receiver 16 into current varying in power in proportion to the transmitted television signals so that any light penetrating the Kerr cell will be effected.

There is here produced a direct vision scanning device through which is projected a ray of light from an intense and constant source—the scanner acting to sweep a pencil of light in arcuate parallel lines on the polarizer 10 and thence through the Kerr cell 15 to the analyzer and screen. Electrical impulses dependent on the shade of the transmitted picture are applied to the Kerr cell 15 through the radio receiver 16 and thus the picture is reconstructed on the screen 11 which as before stated may be a ground glass or other translucent surface, the picture being viewed from this side.

While certain preferred embodiments of this device have been shown and described, it will be understood that changes in the form, arrangements, proportions, sizes and details thereof may be made without departing from the scope of the invention as defined in the appended claims.

Having thus described my invention, what I claim as new and desire to secure by Letters Patent, is:

1. A combined television screen and light controlling means comprising a transparent plate and a translucent plate, respectively polarizer and analyzer arranged with their planes of polarization at right angles said plates having disposed between them an electric responsive cell adapted to rotate the plane of polarization and having an effective light affecting area coextensive with the translucent surface and adapted to vary or control the intensity of light that may pass through the transparent plate and electric responsive means onto the translucent surface.

2. A combined television screen and light controlling means comprising a transparent plate and a translucent plate, both plates being crystal coated and constituting respectively polarizer and analyzer arranged with their planes of polarization at right angles said plates having disposed between them an electric responsive cell adapted to rotate the plane of polarization and having an effective light affecting area co-extensive with the translucent surface and adapted to vary or control the intensity of light that may pass through the transparent plate and electric responsive means onto the translucent surface.

3. A combined television screen and light controlling means comprising a transparent plate and a translucent plate, respectively polarizer and analyzer arranged with their planes of polarization at right angles and a Kerr cell having an effective light affecting area co-extensive with the translucent surface disposed between the plates by which may be varied or controlled the intensity of light that may pass through the transparent plate and the Kerr cell onto the translucent surface.

4. A combined television screen and light controlling means comprising a transparent plate and a translucent plate, both plates crystal coated and constituting respectively polarizer and analyzer arranged with their planes of polarization at right angles said plates having disposed between them a Kerr cell having an effective light affecting area co-extensive with the translucent surface by which may be varied or controlled the intensity of light that may pass pass through the transparent plate and the Kerr cell onto the translucent surface.

JOSEPH LA VIA.